United States Patent [19]

Clements

[11] 4,407,419
[45] Oct. 4, 1983

[54] PORTABLE BOOM SUPPORT FOR VEHICLES

[76] Inventor: Shannon K. Clements, 6216 Locust Dr., Evansville, Ind. 47712

[21] Appl. No.: 335,752

[22] Filed: Dec. 30, 1981

[51] Int. Cl.³ .......................................... B66C 23/78
[52] U.S. Cl. ...................................... 212/189; 182/2; 212/253; 212/232
[58] Field of Search ............................. 212/188–189, 212/191–198, 223–224, 211, 227, 231–232, 237–238, 244, 245, 247–248, 255, 260–261, 265, 253; 182/2; 414/496, 541–543, 631–638; 280/763–766

[56] References Cited

U.S. PATENT DOCUMENTS

| | | | |
|---|---|---|---|
| 2,782,940 | 2/1957 | Beseler | 414/543 |
| 2,787,383 | 4/1957 | Antos et al. | 212/261 |
| 3,011,652 | 12/1961 | Falk et al. | 414/543 |
| 3,378,103 | 4/1968 | Zwight et al. | 182/2 |
| 3,494,489 | 2/1970 | Kruger | 212/189 |
| 3,650,421 | 3/1972 | Miller | 212/189 |

FOREIGN PATENT DOCUMENTS 1213098 3/1966 Fed. Rep. of Germany ...... 212/223

Primary Examiner—Trygve M. Blix
Assistant Examiner—R. B. Johnson
Attorney, Agent, or Firm—Eugene C. Knoblock

[57] ABSTRACT

A portable boom support adapted to be mounted on a vehicle which can be adjusted to the contour of the ground and provides the total support for an aerial boom or similar device during its operation. The boom support includes a frame which is attached to the transport vehicle frame and a turntable support pivotally attached to the frame. The turntable support is shiftable about its pivot point by a brace which is adjustable in length and connected at one end to the turntable support and at its other end to the frame. Lateral stability is provided by adjustable outriggers connected to the frame at its ends.

1 Claim, 7 Drawing Figures

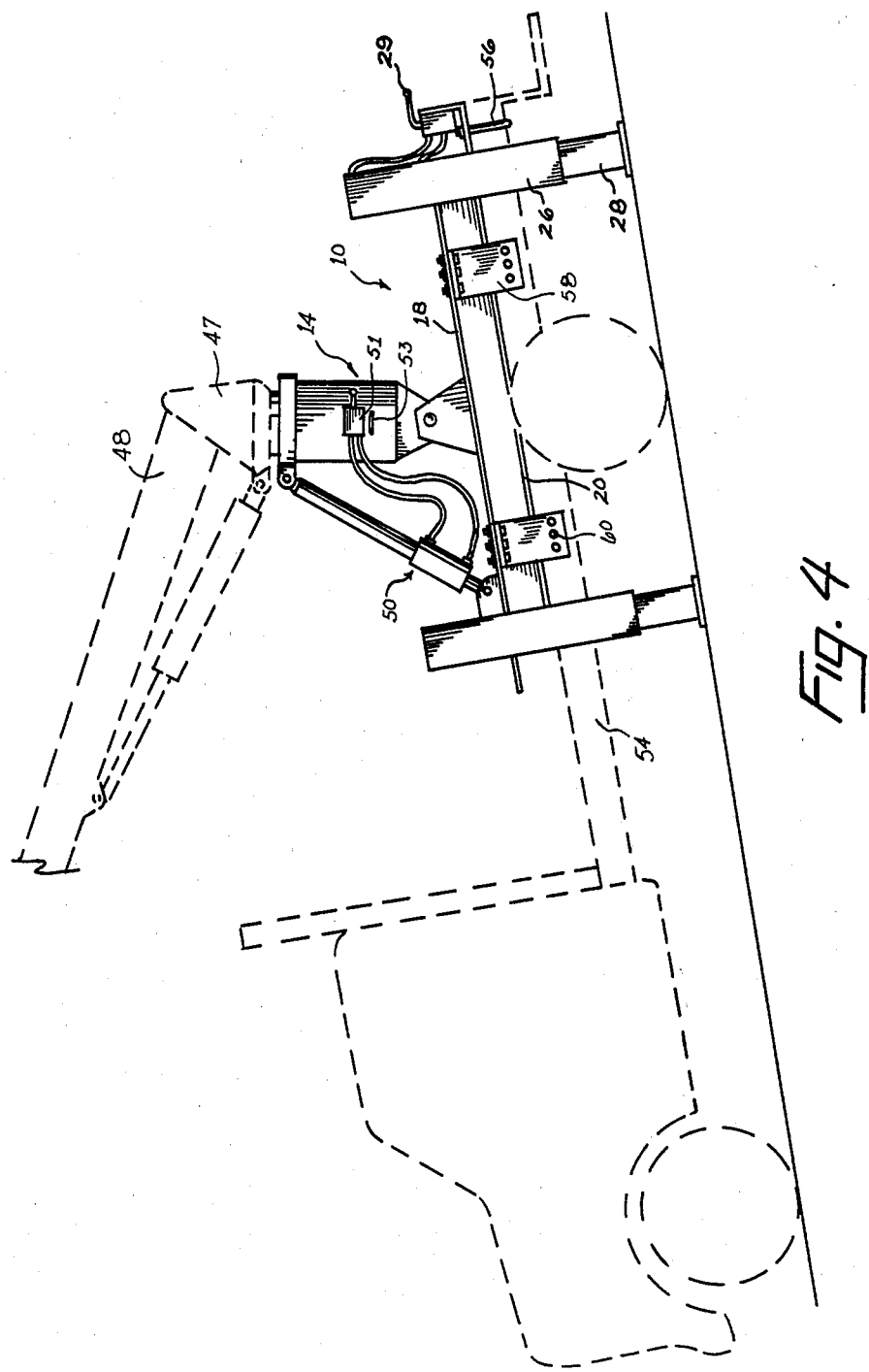

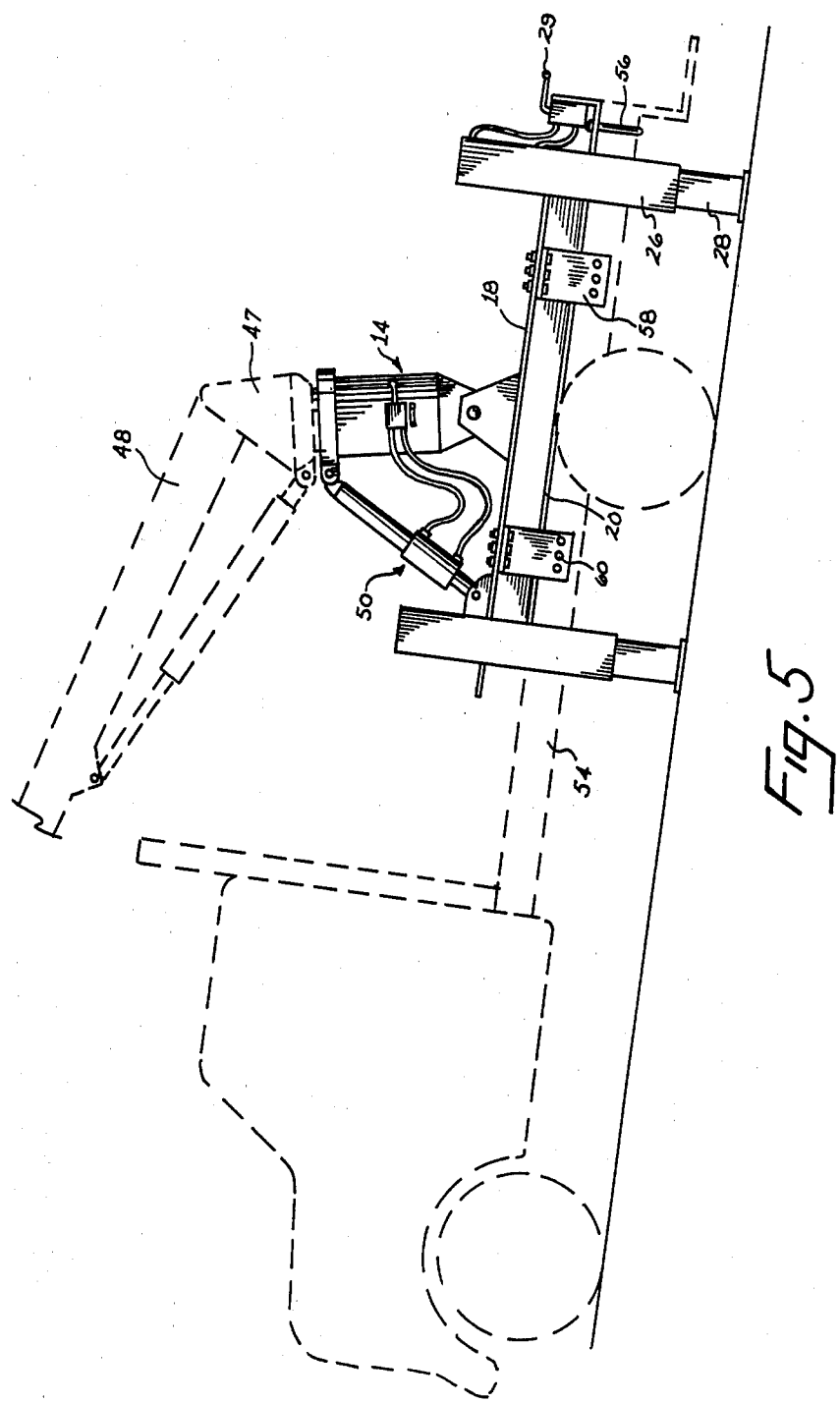

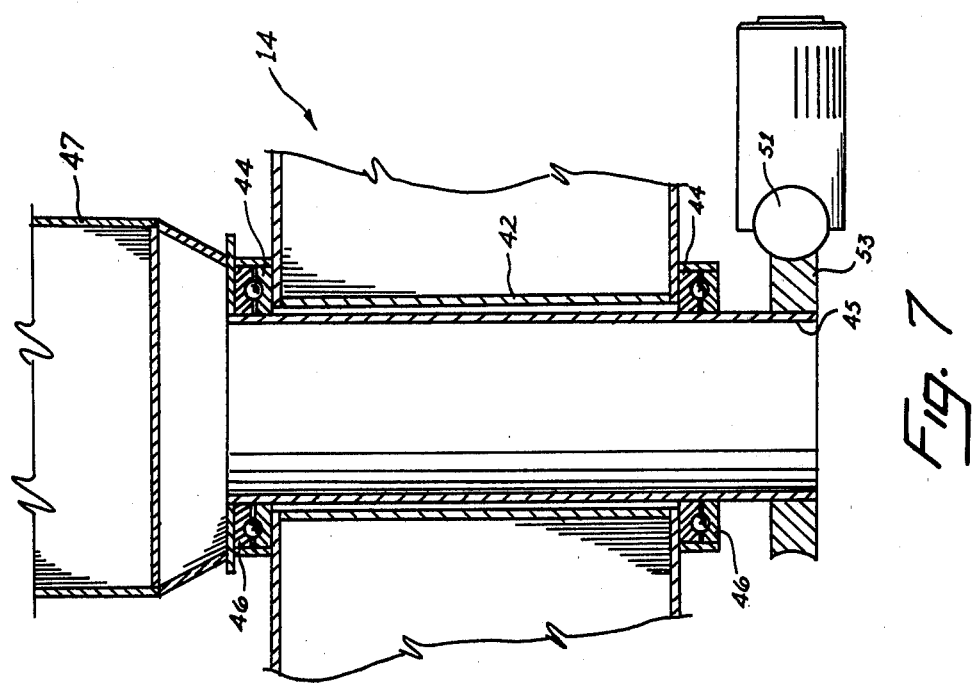

PORTABLE BOOM SUPPORT FOR VEHICLES

SUMMARY OF THE INVENTION

This invention relates to a portable boom support assembly adapted to be mounted on a vehicle and having specific application to use in connection with aerial booms and the like.

The support assembly includes a frame and a turntable support. The frame includes two rigid longitudinal beams spaced apart by upper and lower transverse members secured to the top and bottom of the beams respectively. The frame may be reinforced by braces secured at their ends to the longitudinal beams. Adjustable outriggers are connected to the frame adjacent its ends and may be used to position the frame laterally and, to a smaller degree, longitudinally, with respect to the horizontal.

The turntable support is pivotally attached at its lower end to the frame and is adjustable about the pivot by a brace which is adjustable in length and attached at one end to the frame and at the other end to the upper part of the turntable support. The turntable support includes a tubular core having bearing collars at its top and bottom. The bearing collars rotatably support a boom turntable and mast.

It is an object of this invention to provide a novel portable boom support assembly which mounts upon a vehicle for supporting an aerial boom.

Another object is to provide a portable boom support assembly which may be mounted upon a vehicle frame for transportation of the assembly.

Another object of this invention is to provide a portable boom support assembly which provides the total support for the aerial boom at a work sight.

Another object is to provide a portable boom support assembly which includes an adjustable brace connected at one end to a turntable support mounted on a frame and at the other end to the frame to distribute throughout the frame stresses on the turntable support during operation of the aerial boom.

Another object is to provide a portable boom support assembly having a frame and a turntable support mounted on the frame wherein the support may be positioned in a variety of locations on the frame.

Another object of this invention is to provide a portable boom support assembly which is capable of being constructed to maximize the weight distribution of the assembly throughout the support vehicle frame for better transportation of the assembly.

Other objects of this invention will become apparent from a reading of the following description.

BRIEF DESCRIPTION OF THE DRAWINGS

FIG. 4 is a side view of the portable boom support in operative boom-supporting position as mounted upon a vehicle located at a downhill position.

FIG. 5 is a side view of the portable boom in operative boom-supporting position as mounted upon a vehicle located at an uphill position.

FIG. 7 is an enlarged fragmentary sectional view taken along line 7—7 of FIG. 1.

DESCRIPTION OF THE PREFERRED EMBODIMENT

Figure 1:
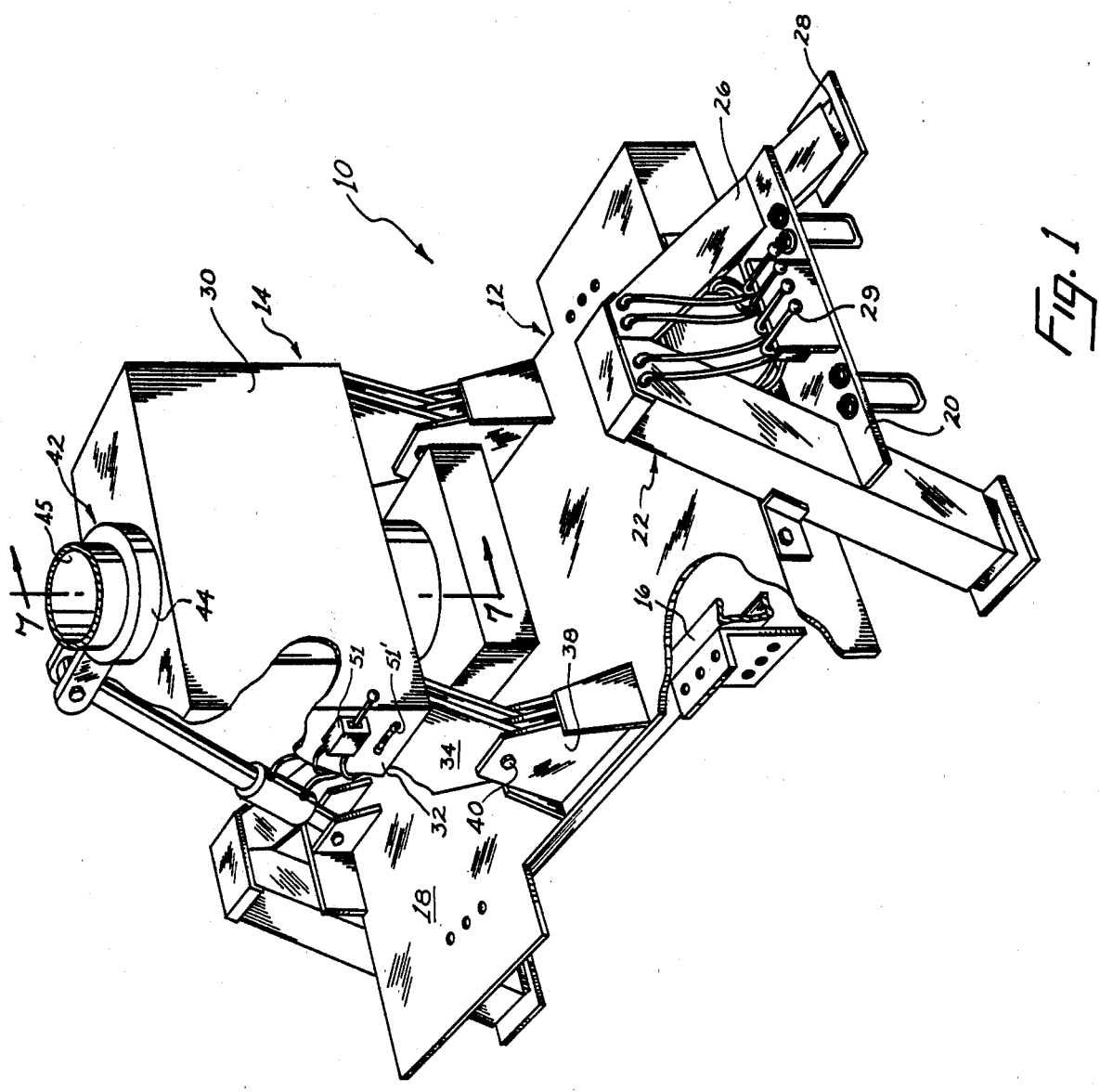
FIG. 1 is a perspective view of the portable boom support with parts broken away for illustration.
Figure 2:
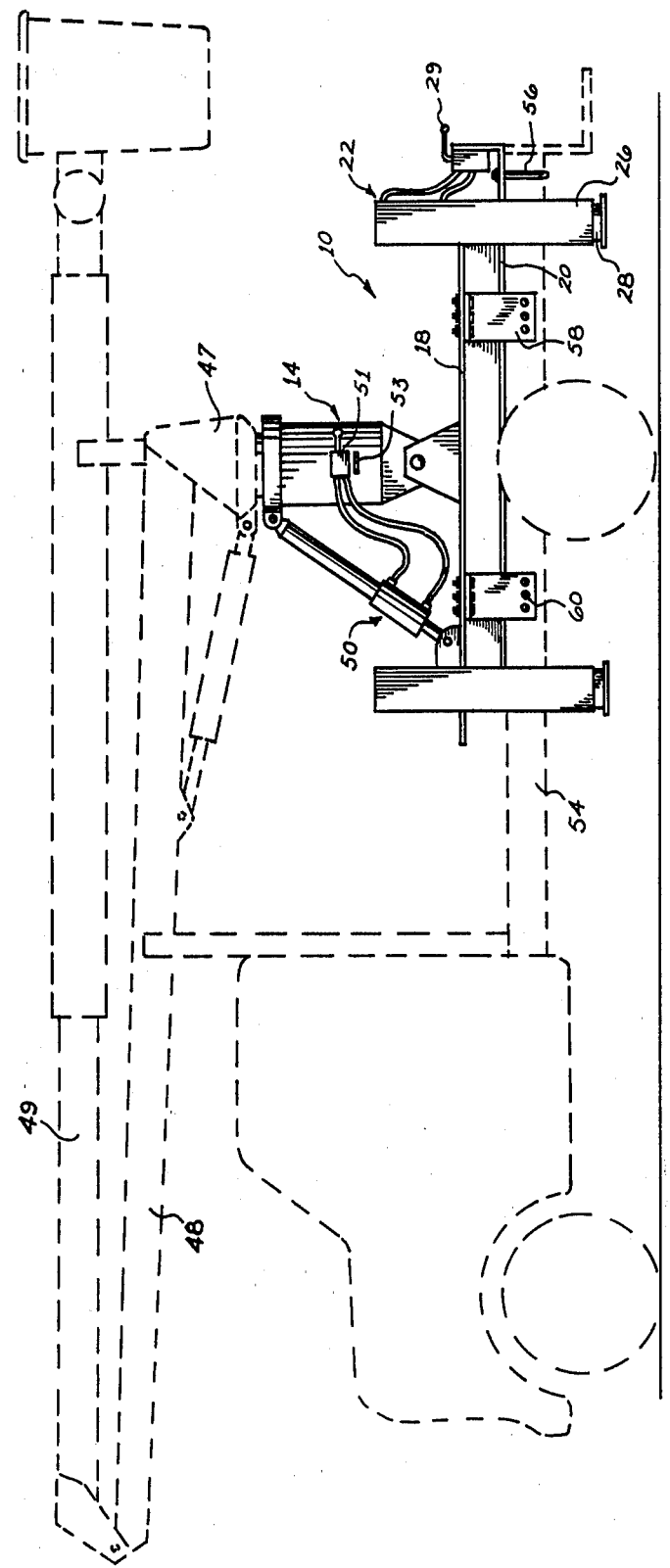
FIG. 2 is a side view of the portable boom support mounted in transport position upon a vehicle.
Figure 6:
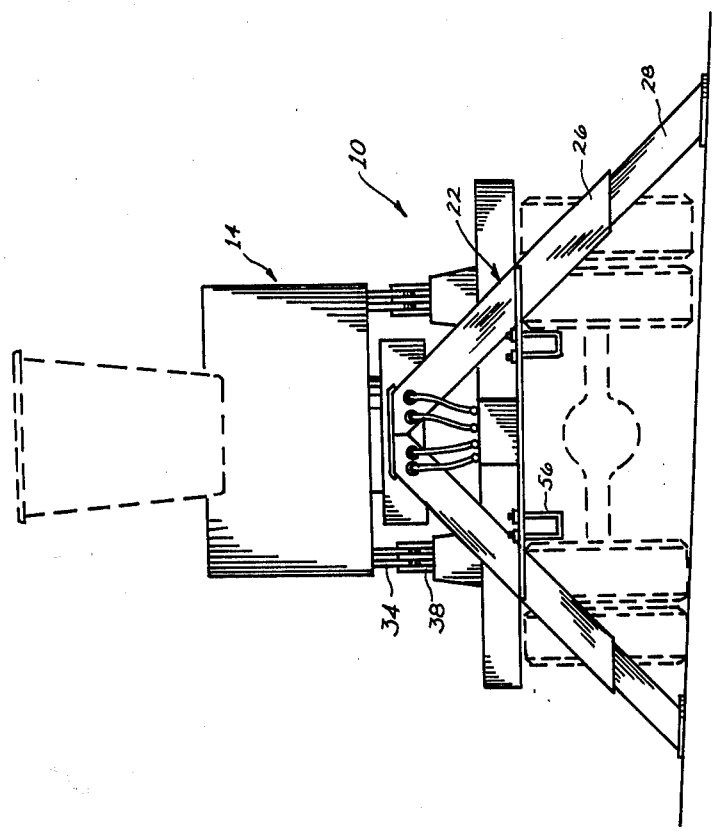
FIG. 6 is a rear view of the portable boom support in operative boom-supporting position as mounted on a vehicle located at a position inclined laterally of the vehicle.
Figure 3:
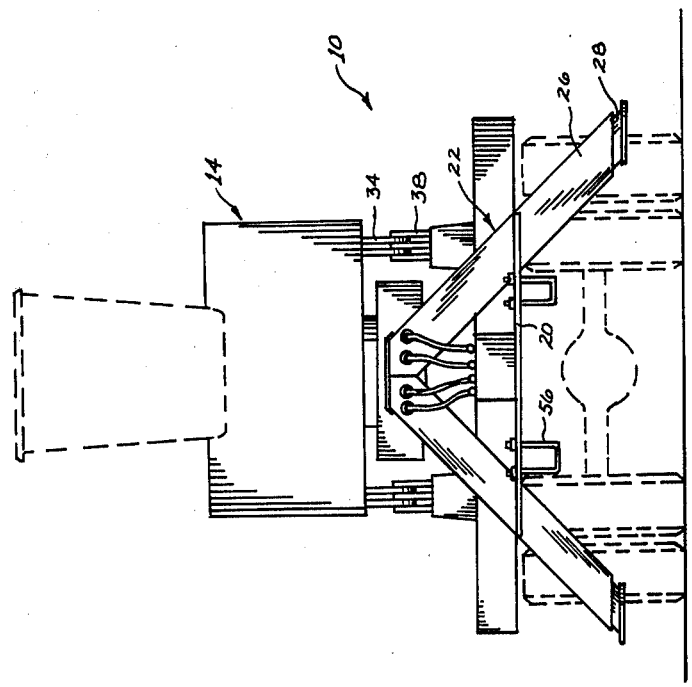
FIG. 3 is a rear view of the portable boom suppot mounted in transport position upon a vehicle.

The preferred embodiment illustrated is not intended to be exhaustive or to limit the invention to the precise form disclosed. It is chosen and described in order to explain the principles of the invention and its application and practical use to thereby enable others skilled in the art to utilize the invention.

The boom support assembly 10 includes a frame 12 and a turntable support or trunk 14. Frame 12 includes two longitudinal rigid beams 16 to which are secured at their top and bottom surfaces a rigid upper plate 18 and a rigid lower plate 20. Adjustable outriggers 22 are fixedly mounted at each end of frame 12 and include a rigid transverse member with downwardly diverging rigid guides 26 each slidably mounting a leg 28. Each outrigger leg 28 is adjustable in a guide 26 in response to hydraulic pressure or other actuating means responsive to one of a group of manual controls 29.

Turntable trunk 14 includes front and rear plates 30 and side panels 32 forming a rigid rectangular unit. One or more rigid triangular vertical plates 34 are secured to and projects below each side panel 32. Each plate 34 is pivotally connected by a pin or bolt 40 to one or more rigid plates 38 which project upwardly from the frame 12. Trunk 14 houses and fixedly mounts a tubular member 42 which is open at its upper and lower ends. Member 42 mounts bearing collars 44 at its upper and lower ends. A shaft 45 is rotatable within member 42 and carries bearing collars 46 each cooperating with a bearing collar 44 on member 42. Shaft 45 mounts a bracket 47 at its upper end to which is pivoted a lower aerial boom arm 48 at whose free end is pivoted an upper aerial boom arm 49. Shaft 45 rotates within the member 42 in response to rotation of a worm gear 51 with which meshes a gear 53 mounted at the lower end of the shaft. A brace 50, preferably hydraulically actuated in response to a controller 51 and including telescoping members to be extendable and retractable, is pivotally connected to trunk 14 at one end and is pivotally connected to the front part of frame 12 at the other end. Trunk 14 may be attached to frame 12 in the position shown or it may be attached at a central or forward position. The point of connection of brace member 50 may be changed accordingly. Controls 51 may be attached to trunk 14 for operating brace 50 to place the trunk in a desired vertical orientation. A level indicator 51' of the bubble type may also be placed upon trunk 14 to indicate the position of the trunk in relation to the vertical.

When subframe 10 is mounted upon a vehicle which is parked in an uphill position, brace member 50 may be retracted as in FIG. 5, and when subframe 10 is placed in a downhill position, member 50 may be extended as in FIG. 4, to maintain trunk 14 in a vertical position, thereby providing a horizontal bearing surface for shaft 45 and an ensuing horizontal orientation for the aerial boom 48 or other attached device.

Frame 12 is attached to truck frame members 54 with U-bolts 56 or similar attachment means which pass through holes in a portion of lower plate 20 to attach to the truck frame member. Tabs 58 are attached to beams 16 and upper plate 18 and depend therefrom in contact with the truck frame members 54. Bolts 60, or similar attachment means are fastened in aligned openings in tabs 58 and truck frame members 54 to retain frame 12 upon the truck frame members for transportation of boom support assembly 10.

It is to be understood that the invention is not to be limited by the above description but may be modified within the scope of the appended claims.

What I claim are the following:

1. A boom support assembly for a vehicle with frame members, said assembly comprising: a frame with upper and lower horizontally disposed plate means, spaced rigid beams mounted between said upper and lower plate means;

adjustable outriggers mounted at each end of said plate means for adjustably positioning said frame relative to a supporting surface to maintain said frame in a selected position;

a turntable support including spaced plates and side panels forming a generally rectangular unit, means pivotally mounting said turntable suport on said upper plate means for movement about a horizontal axis, a vertically tubular member open at it upper and lower ends and fixedly mounted in said unit, a shaft, vertically spaced bearings mounted in said tubular member for rotatably supporting said shaft therein, means operatively connected to the lower end of said shaft for rotating said shaft about a generally vertical axis, bracket means mounted on the upper end of said shaft for pivotally supporting a boom thereon:

means for pivoting said turntable support about said horizontal axis, control means mounted on said unit for actuating said means for pivoting said turntable; and means mounted on said upper and lower plate means and spaced beams for attaching said frame to said frame members of said vehicle.

* * * * *